(12) United States Patent
New

(10) Patent No.: US 6,705,040 B1
(45) Date of Patent: Mar. 16, 2004

(54) FISHING LURE RETRIEVER

(76) Inventor: Robert New, 5 Hayley Street, Manly West, Queensland (AU), 4179

( * ) Notice: Subject to any disclaimer, the term of this patent is extended or adjusted under 35 U.S.C. 154(b) by 0 days.

(21) Appl. No.: 10/111,842

(22) PCT Filed: Oct. 30, 2000

(86) PCT No.: PCT/AU00/01333

§ 371 (c)(1),
(2), (4) Date: Apr. 29, 2002

(87) PCT Pub. No.: WO01/32011

PCT Pub. Date: May 10, 2001

(30) Foreign Application Priority Data

Oct. 29, 1999 (AU) .............................. PQ3766

(51) Int. Cl.[7] .............................................. A01K 97/24
(52) U.S. Cl. ...................................................... 43/17.2
(58) Field of Search ...................................... 43/17.2, 5

(56) References Cited

U.S. PATENT DOCUMENTS

| 2,233,670 | A | * | 3/1941 | Lee | 43/5 |
|---|---|---|---|---|---|
| 2,353,357 | A | * | 7/1944 | Paulick | 43/17.2 |
| 2,507,495 | A | * | 5/1950 | Barthel | 43/17.2 |
| 2,609,632 | A | * | 9/1952 | Davis | 43/17.2 |
| 2,712,706 | A | * | 7/1955 | Gendron | 43/17.2 |
| 2,765,567 | A | * | 10/1956 | Fifer | 43/17.2 |
| 2,798,332 | A | * | 7/1957 | Garrison | 43/17.2 |
| 2,807,906 | A | * | 10/1957 | Mun | 43/17.2 |
| 2,826,849 | A | * | 3/1958 | Frederick | 43/17.2 |
| 2,827,730 | A | * | 3/1958 | Hunt | 43/17.2 |
| 2,828,570 | A | * | 4/1958 | Bradbury | 43/17.2 |
| 2,866,290 | A | * | 12/1958 | Karry | 43/17.2 |
| 2,906,050 | A | * | 9/1959 | Foster et al. | 43/17.2 |
| 3,095,662 | A | * | 7/1963 | Puckett | 43/5 |
| 3,156,064 | A | * | 11/1964 | Czirr | 43/17.2 |
| 3,216,143 | A | * | 11/1965 | Seldon | 43/17.2 |
| 3,360,292 | A | * | 12/1967 | Trammeli | 43/17.2 |
| 3,568,353 | A | * | 3/1971 | Kilgore | 43/17.2 |
| 3,570,163 | A | * | 3/1971 | Conder | 43/17.2 |
| 3,783,546 | A | * | 1/1974 | Meyers | 43/17.2 |
| 3,792,545 | A | * | 2/1974 | Hendrickson | 43/17.2 |
| 4,057,925 | A | * | 11/1977 | Wong | 43/17.2 |
| 4,152,859 | A | * | 5/1979 | Hansen | 43/17.2 |
| 4,536,984 | A | * | 8/1985 | Kowal | 43/17.2 |
| 4,930,244 | A | * | 6/1990 | Enwiller | 43/17.2 |
| 5,081,784 | A | * | 1/1992 | Santucci et al. | 43/17.2 |
| 5,209,006 | A | * | 5/1993 | Wilhelmer | 43/17.2 |
| 5,615,511 | A | * | 4/1997 | Crane et al. | 43/17.2 |

FOREIGN PATENT DOCUMENTS

| AU | 1353783 A | | 8/1984 |
|---|---|---|---|
| CA | 1156834 A | | 11/1983 |
| FR | 899445 B1 | * | 5/1945 |
| JP | 10-210907 B1 | * | 8/1998 |
| JP | 2001-17052 B1 | * | 1/2001 |
| JP | 2001-169707 B1 | * | 6/2001 |
| JP | 2001-292678 B1 | * | 10/2001 |

* cited by examiner

Primary Examiner—Darren W. Ark
(74) Attorney, Agent, or Firm—Leydig Voit & Mayer Ltd.

(57) ABSTRACT

An apparatus for retrieving snagged fishing lures (9) includes an elongated body (10) for sliding down a line (30) to a snagged lure (31). The apparats further includes a latching bow (17) with an intermediate portion (19) that operatively locates over the rear of the lure (31) in order to allow application of retrieval tension by means of cord (22).

8 Claims, 4 Drawing Sheets

FISHING LURE RETRIEVER

FIELD OF THE INVENTION

This invention relates to an apparatus for retrieving snagged fishing lures.

BACKGROUND TO THE INVENTION

In recreational fishing, lures with multiple hooks are often used as a substitute for live bait or as the preferred form of fish attractant.

Lures may be simple spoon type lures which are relatively inexpensive or baits fish profile lures which can be very expensive. Such lures often include arrays of multiple hooks and thus they are prone to snagging. This is especially so when fishing over coral or rocks or adjacent submerged tree branches.

As a result, lure retrievers have been developed with the aim of retrieving snagged lures. Mostly, such lures are specifically developed for a particular purpose and often a fisherman will change lures during a fishing session with a view to optimising their catch. Accordingly fishermen may include several types of lure retrievers in their fishing kits for use depending upon the lure being used and the anticipated snag.

Unfortunately snagged lures are not generally visible to the angler and thus anglers may try different types of retrievers with a view to releasing or freeing the lure from the snag. Typically freeing is achieved by hammering the lure in the reverse direction to the direction of pull from the line with a view to freeing the hooks from the snag, or by engaging the lure with a strong catch which will permit the lure to be forcibly pulled free from the snag. Different types of lure retrievers have been proposed for these different operations.

Accordingly it will be appreciated that anglers may require many types of lure retrievers in their kit in order to cope with the variety of snag situations which could occur in a fishing session. Mostly this is not practical and anglers often accept the loss of expensive lures as a necessary cost.

The present invention aims to alleviate at least one of the above described disadvantages and to provide an improved lure.

SUMMARY OF THE INVENTION

With the foregoing in view, this invention in one aspect resides broadly in a lure retriever including:
  an elongate impact body for impacting upon a snagged lure;
  opposed pivot mountings on the elongate impact body for releasably attaching free end portions of a latching bow to the impact body, and
  bow restrainers spaced from the pivot mountings for restraining the latching bow for limited pivotal movement in a forward projecting attitude, the limited pivotal movement of the bow sufficient to enable the bow to pivot away from the line to pass over a portion of the lure, then return to engage behind a portion of the lure for retrieval.

Preferably the lure retriever further includes a rearwardly located tether member or tether loop for attachment of a retrieval cord Suitably the pivot mounting and bow restrainer permit ready coupling and uncoupling of respective bows to and from the elongate body whereby bows adapted for specific lures or types of lures or sizes may be utilised to suit the lure type or size which is snagged.

The elongate impact body suitably includes a dense core portion such as a lead core whereby the lure retriever may slide freely down a snagged line and impact a snagged lure with sufficient force to free it from the snag. Alternatively the impact body may have only sufficient weight to cause the latching bow to deflect away from the lure upon impact therewith.

The latching bow may have opposed intermediate portions which are maintained inclined to the fore and aft axis of the elongate impact body. Suitably the intermediate portions lead to a narrow throat U-shaped central portion which will engage slidably about a line but be readily obstructed by line attachments.

The fore and aft supporting guides may be hooks from which the elongate impact body may be suspended from a line. Alternatively the fore and aft supporting guides may be spiral wound loops or coils which may be looped about a standing line for captive engagement therewith.

The opposed pivot mountings may be arranged at any position on the elongate impact body and the bow restrainers may be an abutment for a portion of the bow which extends forwardly, laterally or rearwardly from the bow connection with the pivot mountings. Suitably the bow restrainers are in the form of opposed spring latches with which the bow may be engaged for loose retention therein to provide the required pivotal movement.

The pivot mountings may be pins which releasably engage in the elongate impact body such as by screwing therein. Alternatively the pivot mountings may be integral apertured mountings with which hooks or the like on the bow may engage. Suitably the ends of the bows are hook shaped for retention in the apertured mountings and the bow restrainers capture opposed portions of the bows intermediate the hooks and the central or ramped portions of the bow. The pivot mountings and the bow restrainers may be formed from bent spring steel wire as separate forms or as an integral form and secured to the impact body either internally or externally as required.

In another aspect this invention resides broadly in a lure retriever including:
  an elongate impact body;
  fore and aft supporting guides which may be engaged about a snagged line for guiding the lure retriever for travel therealong to the snagged lure;
  opposed bow mountings on the elongate impact body for releasably supporting a latching bow, and
  a latching bow releasably connected to the opposed bow mountings, the latching bow having a central latching part adapted for latching onto the snagged lure.

The opposed bow mountings may be sockets for the ends of the bow. Alternatively the opposed bow mountings may include pivot mountings providing apertures with which hook ends of the latching bow may be engaged and bow restrainers for capturing the bow spaced from the bow mountings.

As in the previous aspect the pivot mounting and bow restrainer suitably permit ready coupling and uncoupling of respective bows to and from the elongate body whereby bows adapted for specific lures or types of lures or sizes may be utilised to suit the lure type or size which is, snagged. Other variations including those described with reference to the first mentioned aspect of this invention may be applied to this further aspect of the invention.

BRIEF DESCRIPTION OF THE FIGURES

In order that this invention may be more readily understood and put into practical effect, reference will now be made to the accompanying drawings which illustrate a typical embodiment of this invention, wherein.

Figure 1:
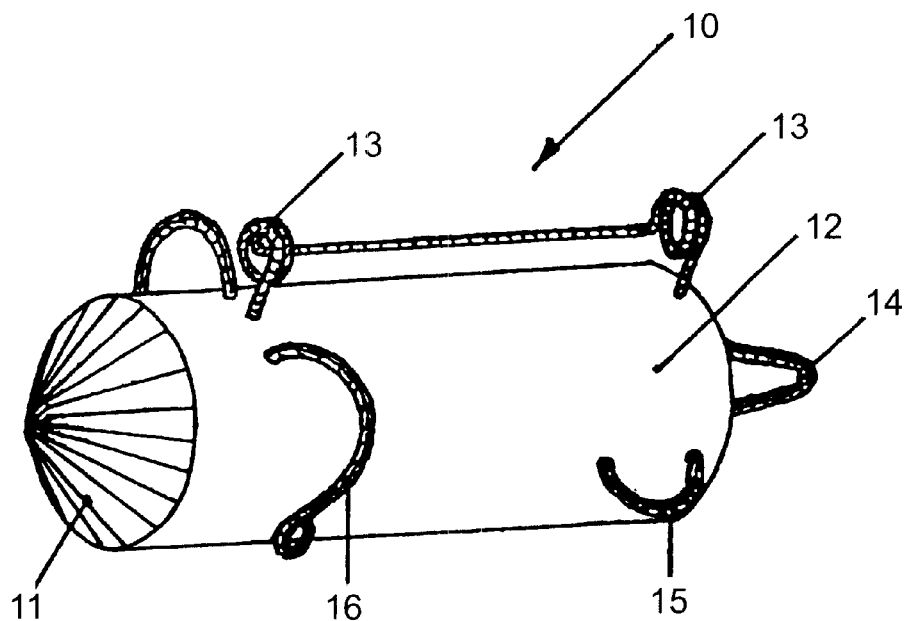
FIG. 1 and FIG. 2 are opposed end views of the impact body of the lure retriever.
Figure 6:
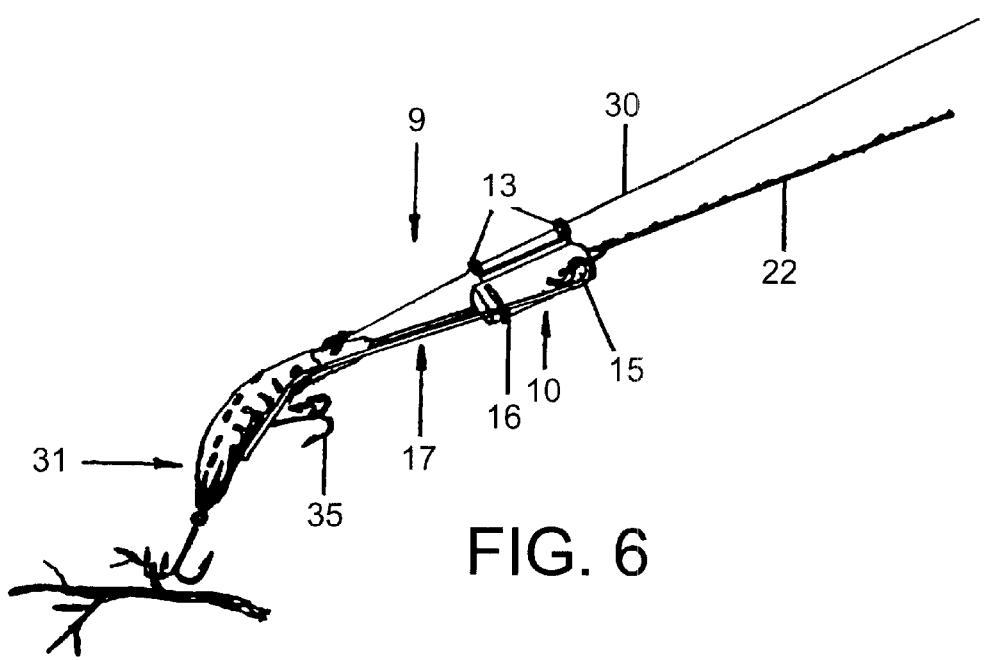
Figure 7:
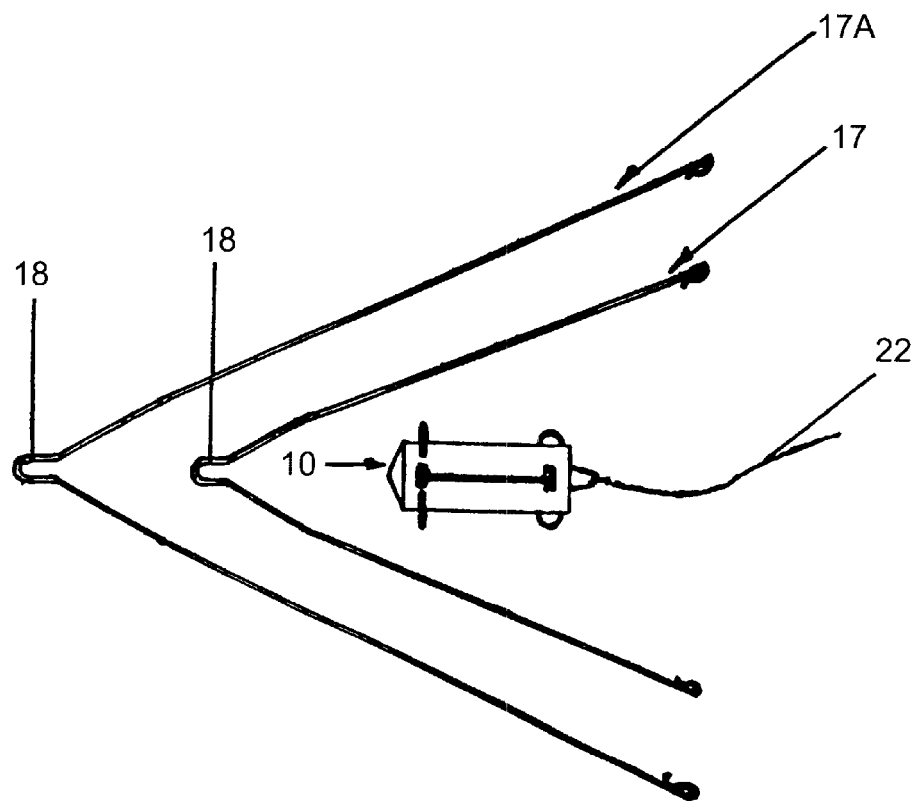
Figure 8:
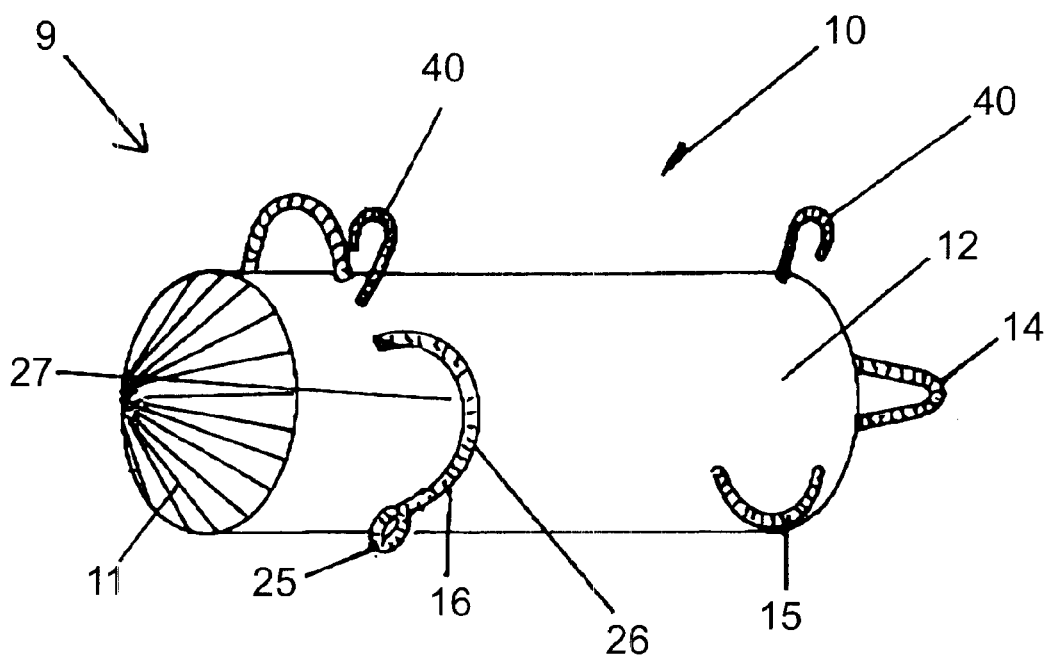

FIGS, 3, 4 and 5 illustrate the progression of the lure retriever along a line over the lure and engaged behind the lure;

FIG. 6 illustrates an alternate use of the lure;

FIG. 7 illustrates the impact body and typical alternate latching bows for use therewith; and FIG. 8 is an end view, similar to FIG. 1, showing an alternate embodiment of for and aft supporting guides.

DETAILED DESCRIPTION OF PREFERRED EMBODIMENTS

Figure 2:
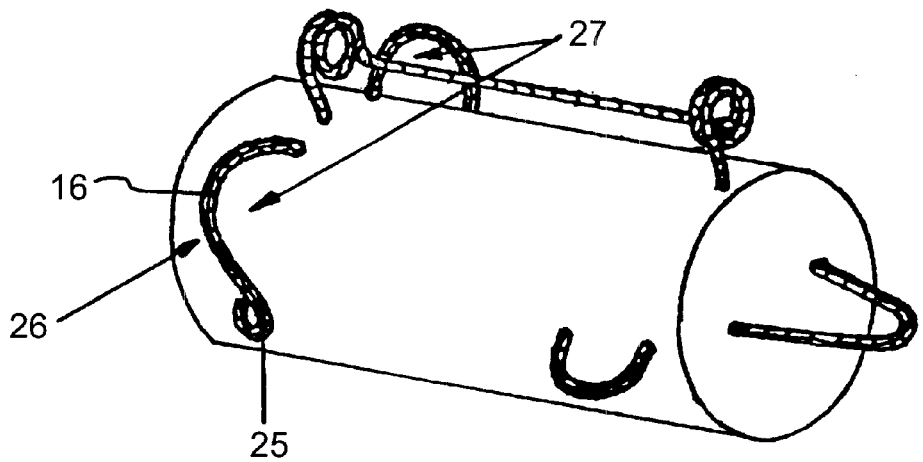

The lure retriever 9 illustrated in FIGS. 1 and 2 has an impact body 10 formed with a central cylindrical body part 11, suitably formed from lead, and supported within an outer stainless steel casing 12. Spiral wound support loops 13 extend upwardly from the casing 12 and enable the impact body 10 to be captively engaged for sliding movement along a standing line such as a fishing line extending from a snagged lure to a user. Alternately, hooks 40 may be provided are fore and aft supporting guides to couple the impact body 10 to a standing line, as shown, for example, in FIG. 8. A tether loop 14 is provided at the rear end of the body 10 for attachment of a retrieval cord. The impact body 10 may be slid down a snagged line and partially retrieved if necessary, by means of cord 14, in order to repeatedly forward impact body 10 upon a lure with a view to releasing the hooks thereon from the snag.

Figure 3:
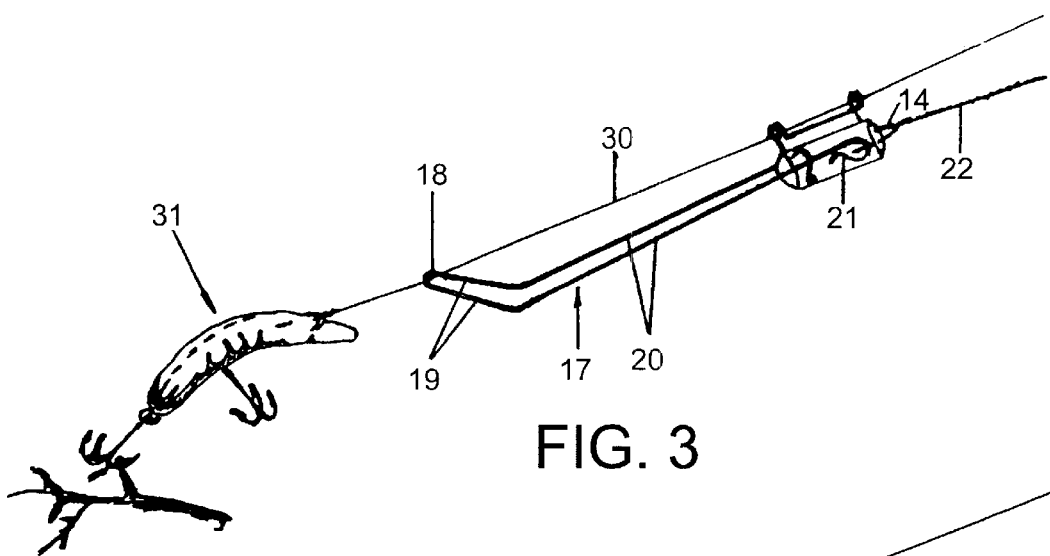

It will be seen that the body 10 also supports opposed bow mountings in the form of rear pivot mountings 15 and front bow restrainers 16 for connecting thereto a suitable latching bow such as illustrated at 17 in FIG. 3. For this purpose, as can be seen more clearly in FIG. 7, a typical latching bow includes a central narrow U-shaped portion 18, intermediate ramped portions 19 and leg portions 20 terminated in hooks 21. Hooks 21 are adapted to be hooked about the opposed rear pivot mountings 15 such that the latching bow can be hauled toward a user via a retrieval cord or tether 22 attached to tether loop 14. Each bow 17 is made of a spring steel wire, which is preferably of stainless steel, so that the hooked ends 21 have to be drawn inwardly against a spring bias toward one another for engagement with the opposed pivot mountings 15.

When engaged therewith the bow 17 may pivot about its connection with the mountings 15, however the legs 20 are drawn together and passed beneath the return portions 25 of open ended catches 26 so that they enter the confined space 27 which limits the degree of pivotal movement of the latching bow about the mountings 15.

Figure 4:
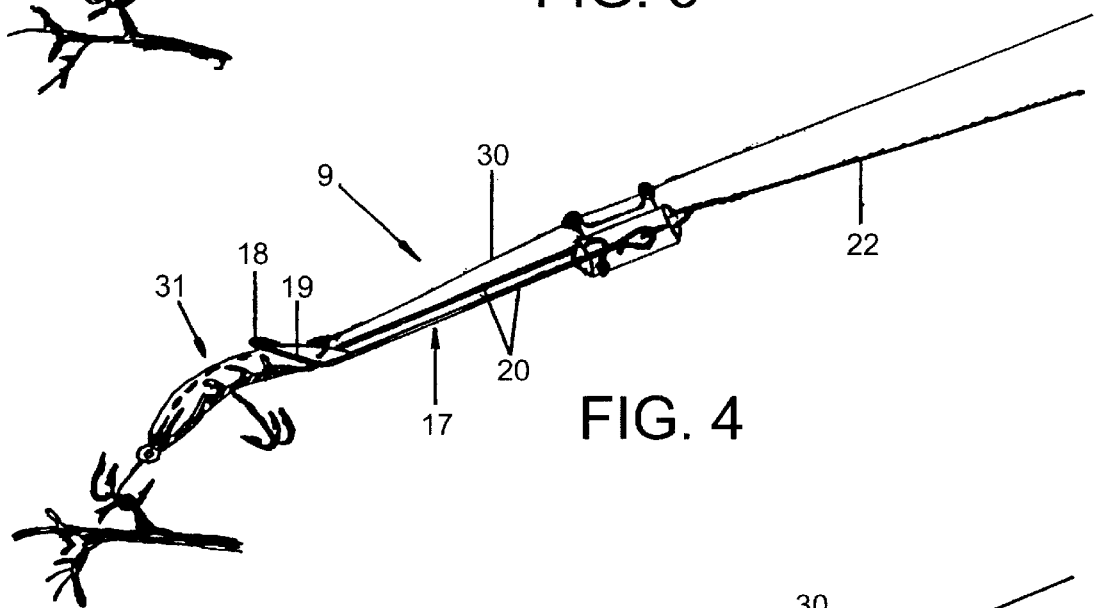

The catches 26 are arranged so that, as illustrated in FIG. 3, an impact body with a latching bow 17 connected thereto may be slid down a fishing line 30 towards a snagged lure 31 with the U-shaped central throat portion 18 sliding along the line. When the U-shaped portion 18 contacts a lure, the ramped portions 19 will force the portion 18 away from the line 30 to permit the bow to pass over the body of the lure 31 as illustrated in FIG. 4 and down beyond the tail 32 of the lure 31.

Figure 5:
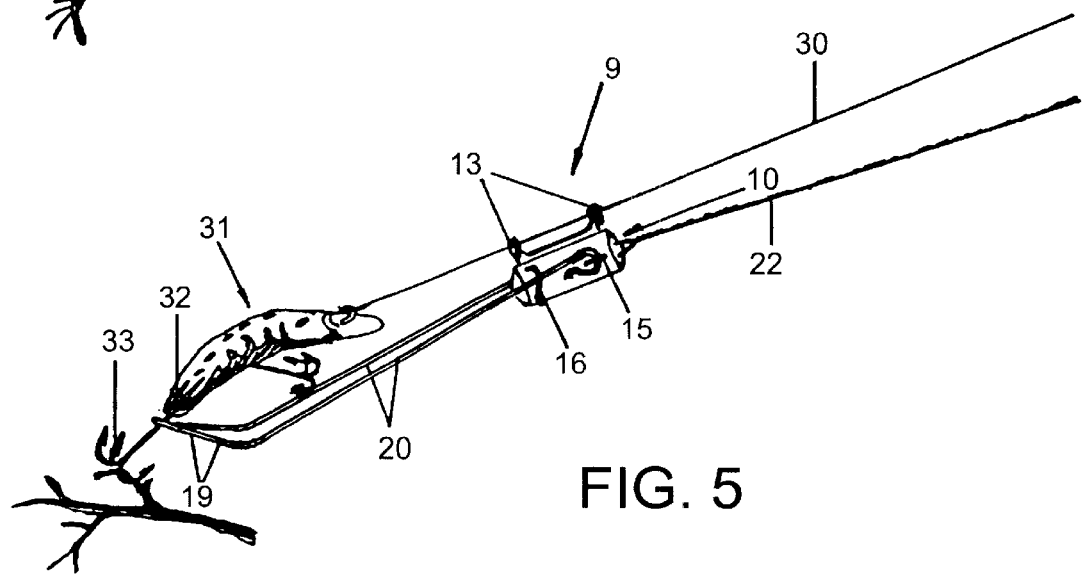

With reference to FIG. 5, the U-shaped portion 18 will fall back down to engage the swivel or line between the tail 32 and the ganged hooks 33. When tension is then applied to the retrieval cord 22, the central portion 18 will tend to move forward until obstructed by the tail 32 whereupon the tension will be transferred to the lure 31 so as to free the hooks 33 from the snag.

If this operation does not succeed, or if a different type of snag is to be treated then, with reference to FIG. 6, the latching bow 17 may be inverted. In the inverted orientation the ramped portions 19 extend downwardly to pass underneath the lure 31 and about the medially supported ganged hooks 35. Once in this position, tension applied to the retrieval cord 22 will be transferred through the bow 17 to the intermediate hooks 35 with a view to freeing the lure from the snag.

FIG. 7 illustrates alternate size latching bows 17 and 17A for attachment with impact body 10. Of course, different size and configuration bows can be utilised to suit the lure to be retrieved and different configuration impact bodies can be used to suit if desired.

From the above it will be seen that the lure retriever of the present invention may be used in a variety of manners and with a variety of latching bows so that it will be useful for retrieving a variety of lures from a variety of snag types.

It will of course be realised that the above has been given only by way of illustrative example of the invention and that all such modifications and variations thereto as would be apparent to persons skilled in the art are deemed to fall within the broad scope and ambit of the invention as is set forth in the following claims.

What is claimed is:

1. A lure retriever for retrieving a snagged fishing lure on a line, said lure retriever including:

a continuous latching bow having free end portions;

an elongate impact body for impacting upon said snagged lure;

opposed pivot mountings on the elongate impact body for releasably attaching said free end portions of said latching bow to the impact body;

fore and aft supporting guides for attaching the elongate impact body to a line; and bow restrainers spaced from the pivot mountings for restraining the latching bow for limited pivotal movement in a forward projecting attitude, the limited pivotal movement of the latching bow sufficient to enable the latching bow to pivot away from the line to pass over a portion of the lure, then return to engage behind a portion of the lure for retrieval wherein the pivot mountings and bow restrainers being arranged to permit ready coupling and uncoupling of respective latching bows to and from the elongate impact body whereby bows adapted for specific lures or types of lures or sizes may be utilized to suit the lure type or size which is snagged;

said latching bow including opposed intermediate portions which are maintained inclined to a fore and aft axis of the elongate impact body; and the pivot mountings and the bow restrainers being formed from bent spring steel wire.

2. A lure retriever according to claim 1 further including a rearwardly located tether member or tether loop for attachment of a retrieval cord.

3. A lure retriever according to claim 1, wherein the elongate impact body includes a dense core portion of lead.

4. A lure retriever according to claim 1, wherein the intermediate portions lead to a narrow throat U-shaped central portion arranged for slidable engagement about a line and dimensioned to be readily obstructed by line attachments.

5. A lure retriever according to claim 1, wherein the fore and aft supporting guides comprise hooks from which the elongate impact body may be suspended from the line.

6. A lure retriever according to claim 1, wherein the fore and aft supporting guides comprise coiled loops which may be looped about the line for captive engagement therewith.

7. A lure retriever according to claim 1, wherein the bow includes a central portion and the intermediate portions comprise ramped portions, and the ends portions of the bow are hook shaped and engage with the pivot mountings and the bow restrainers are arranged to capture opposed portions of the bows intermediate the hooks and the central portion or ramped portions of the bow.

8. A lure retriever according to claim 1, wherein the spring steel wire is stainless steel.

* * * * *